(12) United States Patent
Claise et al.

(10) Patent No.: US 7,941,529 B2
(45) Date of Patent: May 10, 2011

(54) PERIODIC EXPORTING OF INFORMATION OVER A FLOW PROTOCOL (75) Inventors: Benoit Claise, Othee (BE); Ludwig Alexander Clemm, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 12/251,230

(22) Filed: Oct. 14, 2008

(65) Prior Publication Data

US 2009/0228586 A1 Sep. 10, 2009

Related U.S. Application Data (60) Provisional application No. 61/035,298, filed on Mar. 10, 2008.

(51) Int. Cl.
*G06F 15/173* (2006.01)
(52) U.S. Cl. ........................ 709/224; 709/223
(58) Field of Classification Search .................. 709/223, 709/224; 370/392, 235, 252, 229; 719/318
See application file for complete search history.

(56) References Cited

U.S. PATENT DOCUMENTS

| | | | | |
|---|---|---|---|---|
| 2007/0217425 A1* | 9/2007 | Claise et al. | ........... | 370/392 |
| 2007/0274213 A1* | 11/2007 | Stephan et al. | ........... | 370/235 |
| 2008/0228913 A1* | 9/2008 | Fort-Menares et al. | ........ | 709/224 |
| 2008/0279111 A1* | 11/2008 | Atkins et al. | ........... | 370/252 |
| 2009/0168648 A1* | 7/2009 | Labovitz et al. | ........... | 370/229 |
| 2010/0031273 A1* | 2/2010 | Stephan et al. | ........... | 719/318 |

* cited by examiner

*Primary Examiner* — Le Luu
(74) *Attorney, Agent, or Firm* — Schwegman, Lundberg & Woessner, P.A.

(57) ABSTRACT

In some example embodiments, a apparatus and method are shown that include receiving a subscription instruction identifying a subscription to management information from a network device. Additionally, the apparatus and method includes periodically retrieving the management information from the network device. Further, the apparatus and method includes formatting the management information according to an export template. The apparatus and method also includes transmitting the management information utilizing a protocol. A apparatus and network device are also shown that include receiving a management information snapshot as part of a periodic subscription. This apparatus and method includes processing the management information snapshot based upon an export template, the export template defined as part of an IPFIX protocol.

25 Claims, 8 Drawing Sheets

PERIODIC EXPORTING OF INFORMATION OVER A FLOW PROTOCOL

CROSS REFERENCE TO RELATED APPLICATIONS

This is a non-provisional patent application claiming the benefit of U.S. Provisional Patent Application No. 61/035,298 filed on Mar. 10, 2008 entitled "PERIODIC EXPORTING OF INFORMATION OVER A FLOW PROTOCOL," which is incorporated by reference in its entirety.

FIELD

This application relates to an apparatus and method for documenting traffic in a network.

BACKGROUND

Internet Protocol Flow Information eXport (IPFIX) is a protocol that is used to monitor network traffic. In apparatus and methods implementing IPFIX, a number of devices or applications may be utilized to monitor this network traffic. These devices or applications may include a metering device or application, a collection device or application, and/or a network management device or application. Varying export protocols may be used in conjunction with IPFIX including a User Datagram Protocol/Internet Protocol (UDP/IP), a Transmission Control Protocol/IP (TCP/IP) or a Stream Control Transmission Protocol/IP (SCTP/IP) to transmit messages regarding network traffic.

BRIEF DESCRIPTION OF DRAWINGS

The presently shown apparatus and method are illustrated by way of example and not limitation in the figures of the accompanying drawings, in which like references indicate similar elements and in which.

DESCRIPTION OF EXAMPLE EMBODIMENTS

Overview

In some example embodiments, an apparatus and network device are shown that include receiving a subscription instruction identifying a subscription to management information from a network device. Additionally, the apparatus and method includes periodically retrieving the management information from the network device. Further, the apparatus and method includes formatting the management information according to an export template. The apparatus and method also includes transmitting the management information utilizing a protocol.

In some example embodiments, an apparatus and network device are shown that include receiving a management information snapshot as part of a periodic subscription. The apparatus and method also include processing the management information snapshot based upon an export template, the export template defined as part of an IPFIX protocol.

Figure 1:
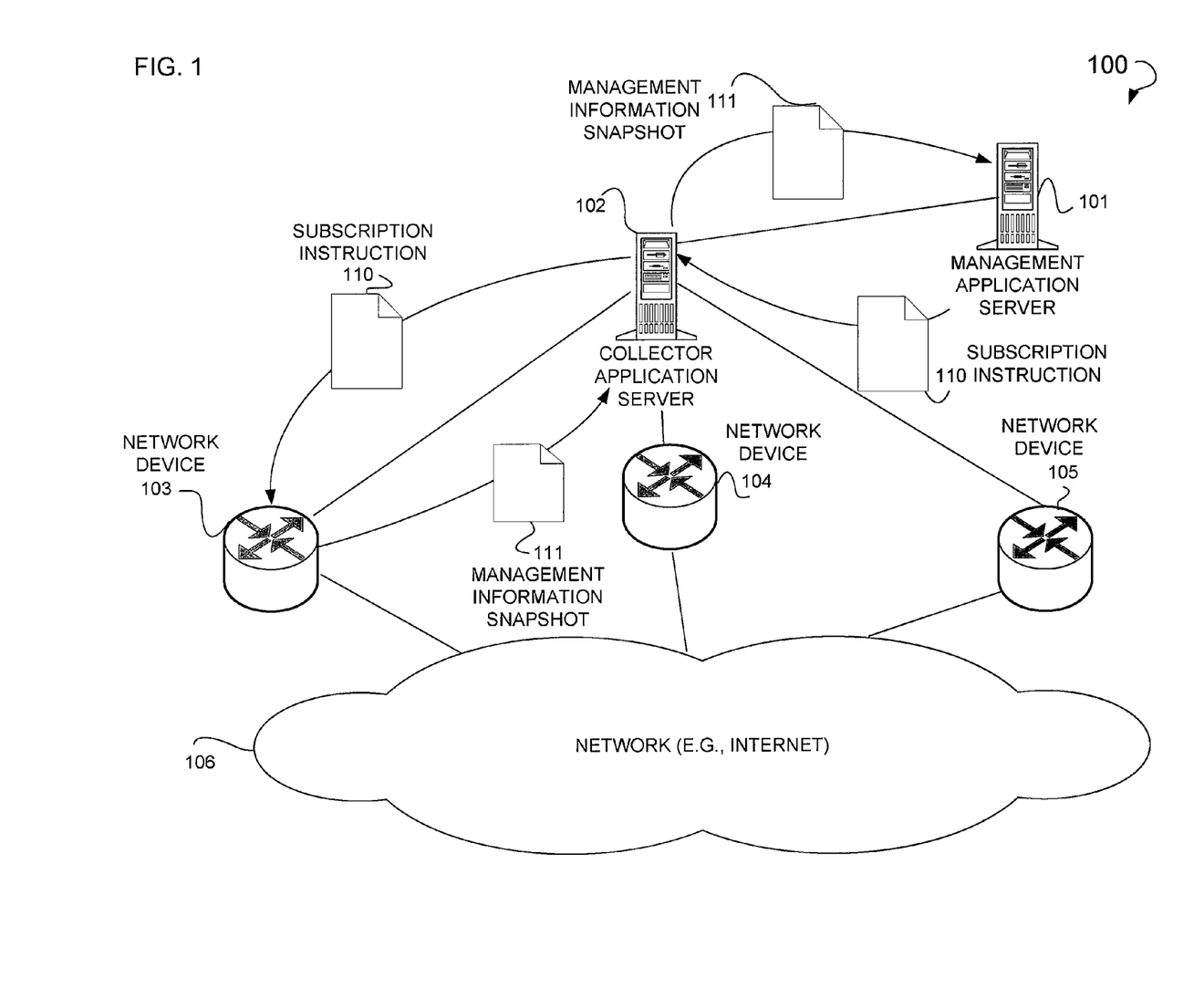
FIG. 1 is a diagram of a system, according to an example embodiment, illustrating the retrieval of management information based upon a subscription.

FIG. 1 is an example system diagram 100 illustrating the generation of a management information snapshot. Shown is a management application server 101. This management application server 101 may be used by a system administrator or other suitable individual to generate a subscription instruction 110. The subscription instruction 110 instructs a network device as to what management information is to be periodically reported, and the reporting periods during which this management information is to be reported. In some example embodiments, this subscription instruction 110 includes an instruction in the form of a regular expression instructing the network device as to what management information is to be retrieved and the period during which this management information is to be reported. The instruction itself may be written as an eXtensible Markup Language (XML) Processing Instruction (XMLPI), a Command Line Interface (CLI) language, a UNIX csh-shell language, a bash-shell language, Perl, Python or some other suitable scripting language. Further, this subscription instruction 110 may include an information ID defining a data type to be used to store the management information. Additionally, this subscription instruction 110 also includes a size value (e.g., in octets) for this data type. Management information includes information relating to a network device and the functioning of the network device. Example management information includes the Central Processing Unit (CPU) cycles for a network device, a current time for the network device, memory utilization by the network device, link utilization by the network device, or error data generated by the network device. Additionally, this subscription instruction 110 is written using some type of scripting language used to retrieve information from a network device. For example, the subscription instruction 110 may be written in a CLI language, and may utilize a "show" command associated with this language. This subscription instruction 110 initiates a subscription to receive management information from the network device.

In some example embodiments, the subscription instruction 110 is transmitted by a collector application server 102. This collector application server 102 may be a NetFlow collector. In some example embodiments, the management application server 101 and collector application server 102 reside upon the same device. Operatively connected to the collector application server 102 may be a native or non-native persistent or non-persistent storage device (not shown). This native or non-native persistent or non-persistent storage device may be connected via a logical or physical connection. Further, the collector application server 102 transmits, or otherwise exports, the subscription instruction 110 to one or more network devices 103, 104, and 105. The network devices 103, 104, and/or 105 may be a router, switch, bridge or other suitable layer 1, 2, or 3 device. A layer may be defined in the Transmission Control Protocol/Internet Protocol (TCP/IP) model or Open System Interconnection (OSI) basic reference model. These network devices 103-105 may be a NetFlow exporter. These network devices 103, 104, and 105 may be operatively connected to a network 106. In some example embodiments, a dedicated line may exist to operatively connect the network devices 103 through 105 and the collector application server 102. Additionally, in some example embodiments, the system administrator may generate the subscription instruction 110 using the collector application server 102. In one example embodiment, the subscription instruction 110 is received by a network device 103.

In some example embodiments, the network device 103 transmits a management information snapshot 111 in fulfillment of a subscription initiated by the receipt of the subscription instruction 110. The management information snapshot 111 may be transmitted to the collector application server 102 over a protocol such as IPFIX. The management information snapshot 111 includes information that reflects snapshot data including certain operation data obtained via, for example, the CLI command (e.g., the "show" command). Operational data may refer to the state and statistical data that is obtained via the CLI "show" command. This management information snapshot 111 includes for example data relating to the CPU cycles for the network device 103, the current time for the network device 103, memory utilization by the network device 103, link utilization by the network device 103 or error data generated by the network device 103. Further, this management information snapshot 111 is formatted using a template specific to a particular protocol such as IPFIX in combination with some other type of protocol such as UDP/IP, TCP/IP, SCTP/IP, or some other suitable protocol. The management information snapshot 111 is received by the collector application server 102, and ultimately processed by a management application (e.g., displayed to a network administrator and/or stored on a server). Collectively or individually, the management application server 101 and collector application server 102 may be referred to as a "subscribing device(s)."

In one example embodiment, a scripting language is used to generate the subscription instruction 110. The protocol used to set up the subscription via the subscription instruction 110 includes Netconf, a Simple Network Management Protocol (SNMP), or some other suitable protocol. The subscription instruction 110 is used to subscribe to a network device. For example, an application residing on the collector application server 102 or management application server 101 requests a subscription to the network device 103. As part of the subscription, the application defines the information to subscribe to using CLI, along with the filter. Further, as part of the subscription, the application also defines an IPFIX information element used to carry the result of the subscription (e.g., the management information). The network device 103 includes an IPFIX information element in the template that the IPFIX information element defines and, according to which, the management information is formatted. The IPFIX template includes the various information elements that have been requested as part of the subscription instruction 110.

In some example embodiments, the IPFIX template is periodically communicated back to the subscribing device as part of the management information snapshot 111. The IPFIX template instructs the collector application server 102 and management application server 101 as to how the records included in the management information snapshot 111 are to be interpreted. In some example embodiments, as will be more fully discussed below, the IPFIX template is initially communicated back to the subscribing devices as part of the management information snapshot 111. Subsequent to this initial communication of the IPFIX template, only the specific subscribed-to management information is transmitted to the subscribing devices. In this example embodiment, a template ID is transmitted as part of the management information snapshot 111 so as to identify the template to be used in formatting the management information transmitted by the subscribing devices.

In some example embodiments, a new IPFIX information element is defined by a subscribing device and used in the transmission of the management information snapshot 111. For example, assume the output for a CLI "show" output command generated by a subscribed to device is as follows:

IP CEF with switching (Table Version 40), flags=0x0

11 routes, 0 reresolve, 0 unresolved (0 old, 0 new), peak 1

1 instant recursive resolution, 0 used background process 11 leaves, 16 nodes, 18312 bytes, 49 inserts, 38 invalidations 0 load sharing elements, 0 bytes, 0 references universal per-destination load sharing algorithm, id 7C56BD82

3(0) CEF resets, 1 revisions of existing leaves

Resolution Timer: Exponential (currently 1 s, peak 1 s)

163 cpu cycles 1 in-place/0 aborted modifications refcounts: 4374 leaf, 4352 node A filter may be applied to yield just the values of interest. For example, a Global Regular Expression Print (GREP) filter may be applied using the following expression as part of the subscription instruction 110:

show ip cef summary|include CPUcycle|grep "inserts, [\s+] (.*)\s.

The result of this expression and filter is an information instance in the form of the "cpu cycles" represented here as "163." A new IPFIX information element is defined by the subscribing device for this information instance as part of the IPFIX template. An IPFIX template is defined by a network device (e.g., the network devices 103 through 105) for records that include this information element. Such an IPFIX template is presented as follows:

```
 +-+-+-+-+-+-+-+-+-+-+-+-+-+-+-+-+-+-+-+-+-+-+-+-+-+-+-+-+-+-+-+-+
         0                   1                   2                   3
         0 1 2 3 4 5 6 7 8 9 0 1 2 3 4 5 6 7 8 9 0 1 2 3 4 5 6 7 8 9 0 1
        +-+-+-+-+-+-+-+-+-+-+-+-+-+-+-+-+-+-+-+-+-+-+-+-+-+-+-+-+-+-+-+-+
        |         Set ID = 2            |         Length = 16           |
        +-+-+-+-+-+-+-+-+-+-+-+-+-+-+-+-+-+-+-+-+-+-+-+-+-+-+-+-+-+-+-+-+
        |        Template ID 256        |        Field Count = 1        |
        +-+-+-+-+-+-+-+-+-+-+-+-+-+-+-+-+-+-+-+-+-+-+-+-+-+-+-+-+-+-+-+-+
        |1| Information Element Id. = 500 |        Field Length = 8       |
        +-+-+-+-+-+-+-+-+-+-+-+-+-+-+-+-+-+-+-+-+-+-+-+-+-+-+-+-+-+-+-+-+
        |                        "Enterprise number"                    |
        +-+-+-+-+-+-+-+-+-+-+-+-+-+-+-+-+-+-+-+-+-+-+-+-+-+-+-+-+-+-+-+-+
```

As illustrated above, an "Information Element Id." is denoted as "500." The information element to which the Information Element Id. refers can accommodate a value of 8 octets (e.g., eight characters) in length. Values over 8 octets are truncated. Additionally, shown is a "Template ID" value here denoted as "256." This Template ID value may be used by the subscribing device to format the information instance.

In some example embodiments, this IPFIX template is used to process management information as the data record:
38 CPU cycles at time "t"

Further, the management information snapshot 111 may reflect this management information as:

```
         0                   1                   2                   3
         1 2 3 4 5 6 7 8 9 0 1 2 3 4 5 6 7 8 9 0 1 2 3 4 5 6 7 8 9 0 1
        +-+-+-+-+-+-+-+-+-+-+-+-+-+-+-+-+-+-+-+-+-+-+-+-+-+-+-+-+-+-+-+-
        |         Set ID = 256          |          Length = 12          |
        +-+-+-+-+-+-+-+-+-+-+-+-+-+-+-+-+-+-+-+-+-+-+-+-+-+-+-+-+-+-+-+-
        |                                38                              |
        +-+-+-+-+-+-+-+-+-+-+-+-+-+-+-+-+-+-+-+-+-+-+-+-+-+-+-+-+-+-+-+-
```

In some example embodiments, management information is aggregated into a single management information snapshot 111. This management information snapshot 111 may illustrate a plurality of time intervals during which management information is collected. As shown below, three consecutive snapshots may be taken:

38 CPU cycles at time period 1, 163 CPU cycles at time period 2, 587 CPU cycles at time period 3

These three consecutive snapshots may be aggregated into the following management information snapshot:

```
 0                   1                   2                   3
 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Set ID = 256          |          Length = 28         |
+-+-+-+-+-+-+-+-+-+-+-+-+-+-+-+-+-+-+-+-+-+-+-+-+-+-+-+-+-+-+-+-+
|                               38                              |
+-+-+-+-+-+-+-+-+-+-+-+-+-+-+-+-+-+-+-+-+-+-+-+-+-+-+-+-+-+-+-+-+
|                              163                              |
+-+-+-+-+-+-+-+-+-+-+-+-+-+-+-+-+-+-+-+-+-+-+-+-+-+-+-+-+-+-+-+-+
|                              587                              |
+-+-+-+-+-+-+-+-+-+-+-+-+-+-+-+-+-+-+-+-+-+-+-+-+-+-+-+-+-+-+-+-+
```

The manner in which the management data is aggregated is contingent upon the needs of a particular subscribing device and may be dictated by a user of this subscribing device. Further, a snapshot may include multiple pieces of data such that the IPFIX template includes multiple information elements.

Figure 2:
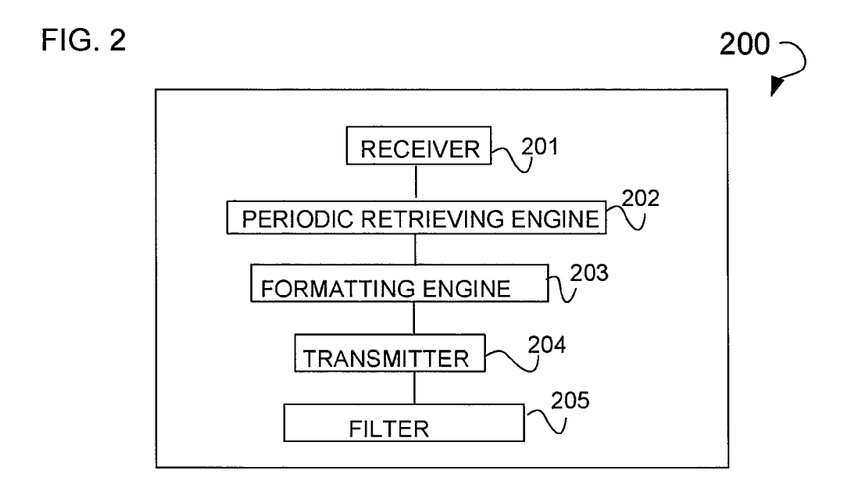
FIG. 2 is a block diagram of an apparatus, according to an example embodiment, used to transmit management information as part of a subscription.

FIG. 2 is a block diagram of an example apparatus 200 used to transmit management information as part of a subscription. This apparatus 200 may be the network device 103. The blocks represented within this block diagram may be implemented in hardware, firmware, or software. These blocks may be operatively coupled via a logical or physical connection. These blocks may be implemented by the network devices 103 through 105 and include a receiver 201, a periodic retrieving engine 202, formatting engine 203, a transmitter 204, and a filter 205. A receiver 201 is shown that receives a subscription instruction, which identifies a subscription to management information, from a network device. A periodic retrieving engine 202 is shown to periodically retrieve the management information from the network device. A formatting engine 203 is shown to format the management information according to an export template. A transmitter 204 is shown to transmit the management information utilizing a protocol. In some example embodiments, the subscription instruction includes a CLI command and an instruction including at least one of a snapshot interval instruction or an optional report interval instruction. This command may be the "show" command. In some example embodiments, the snapshot interval instruction identifies an interval of time. A filter 205 is shown to filter a CLI command output, using a regular expression, to generate the management information. In some example embodiments, the export template is based on an IPFIX template. In some example embodiments, the protocol is the IPFIX protocol.

Figure 3:
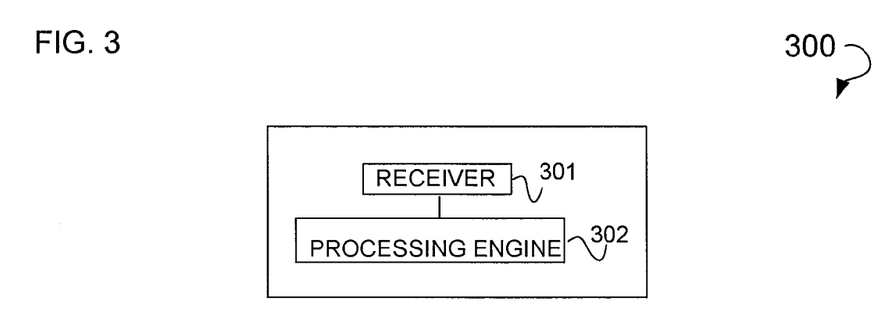
FIG. 3 is a block diagram of an apparatus, according to an example embodiment, used to format and process management information.

FIG. 3 is a block diagram of an example apparatus 300 used to format and process management information as part of a subscription. This apparatus 300 may be the management application server 101 or collection application server 102. The blocks represented within this block diagram may be implemented in hardware, firmware, or software. These blocks may be operatively coupled via a logical or physical connection. These blocks may be implemented as part of the management application server 101 or collection application server 102. The blocks include a receiver 301, and processing engine 302. A receiver 301 is shown to receive a management information snapshot as part of a periodic subscription. A processing engine 302 is shown to process the management information snapshot based upon an export template. In some example embodiments, the process engaged in by the processing engine 302 includes at least one of displaying a data record defined by the IPFIX protocol, or storing a data record defined by the IPFIX protocol. Further, in some example embodiments, the management information snapshot includes aggregated management information.

Figure 4:
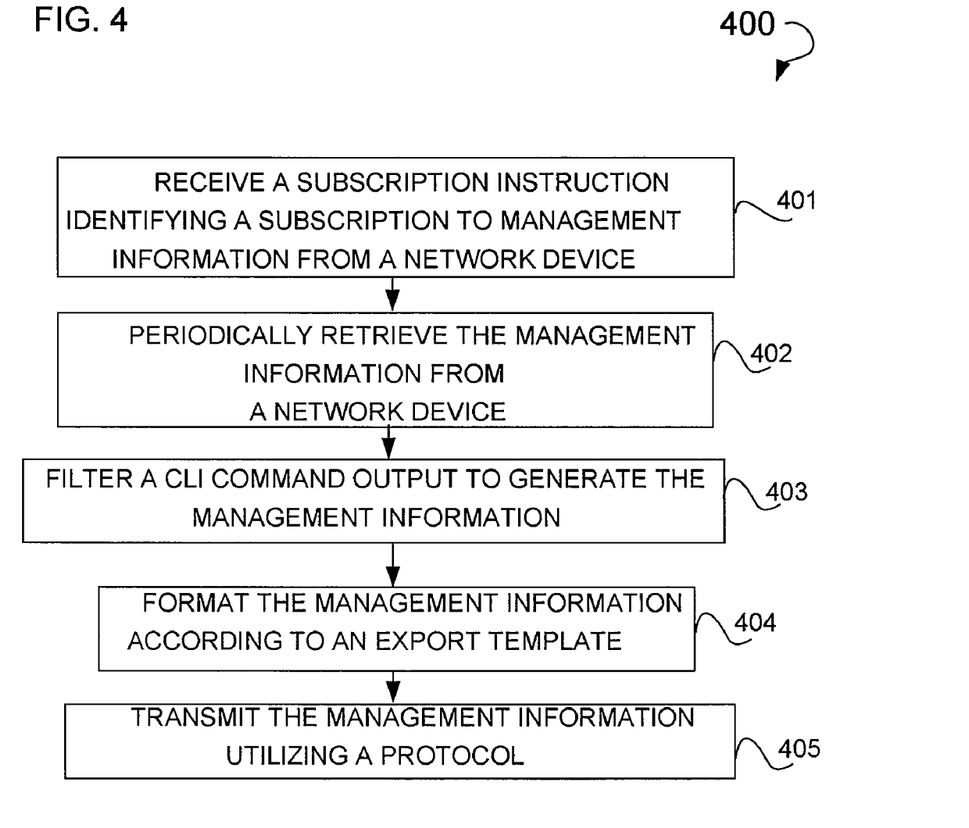
FIG. 4 is a flow chart illustrating a method, according to an example embodiment, used to transmit management information as part of a subscription.

FIG. 4 is a flow chart illustrating an example method 400 used to transmit management information as part of a subscription. Shown are operations 401 through 405 that may be executed by the network devices 103 through 105. Operation 401 is executed to receive a subscription instruction identifying a subscription to management information from a network device. Operation 402 is executed to periodically retrieve the management information from the network device. Operation 403 is executed to filter a CLI command output, using a regular expression, to generate the management information. Operation 404 is executed to format the management information according to an export template (e.g., the IPFIX template). Operation 405 is executed to transmit the management information utilizing a protocol. In some example embodiments, the subscription instruction includes a CLI command, and an instruction including at least one of a snapshot interval instruction, or an optional report interval instruction. This command may be the "show" command. In some example embodiments, the snapshot interval instruction identifies an interval of time. In some example embodiments, management information includes a representation of CPU cycles for the network device, a current time for the network device, memory utilization by the network device, link utilization by the network device, or error data generated by the network device.

Figure 5:
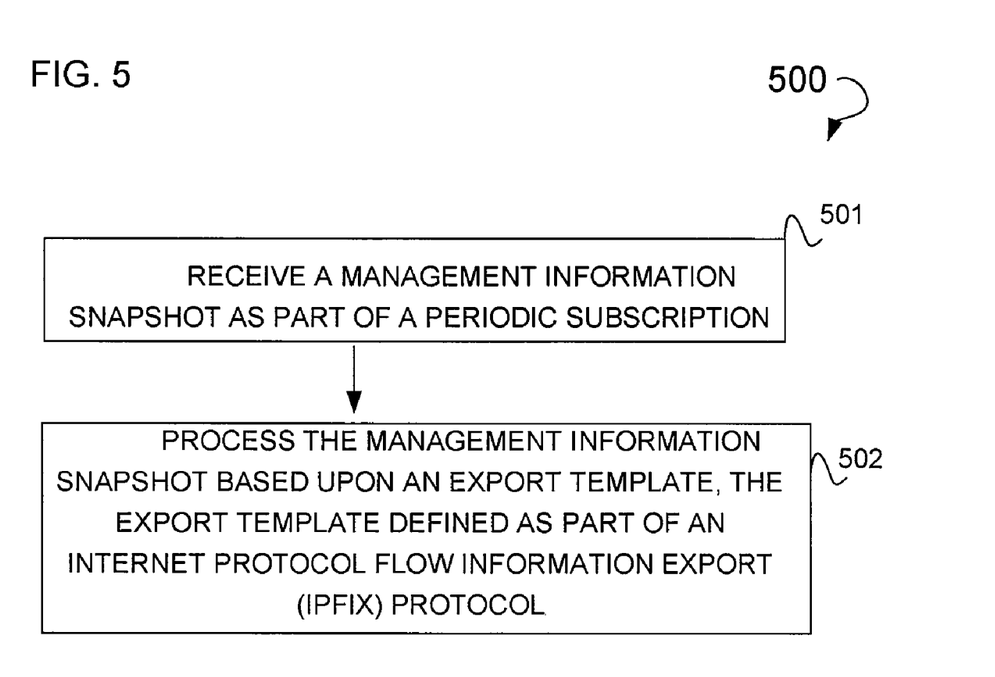
FIG. 5 is a flow chart illustrating a method, according to an example embodiment, used to format and process management information.

FIG. 5 is a flow chart illustrating an example method 500 used to format and process management information. Shown are operations 501 through 503 that may be executed by the collector application server 102 or the management application server 101. Operation 501 is executed to receive a management information snapshot as part of a periodic subscription. Operation 502 is executed to process the management information snapshot based upon an export template. In some example embodiments, the process includes at least one of displaying a data record defined by the IPFIX protocol or storing a data record defined by the IPFIX protocol. Further, in some example embodiments, the management information snapshot includes aggregated management information.

Figure 6:
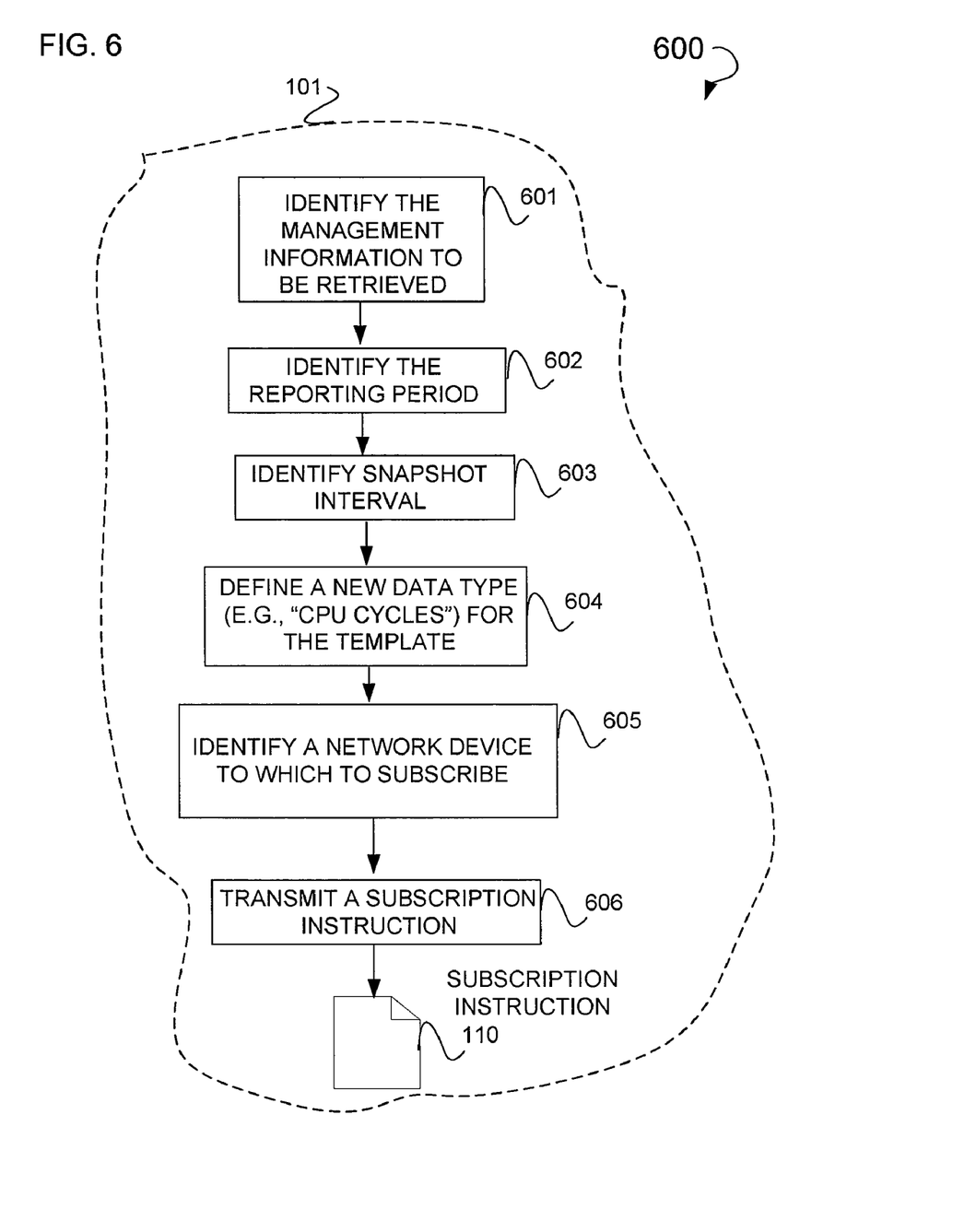
FIG. 6 is a flow chart illustrating a method, according to an example embodiment, used to generate a subscription instruction that includes a template.

FIG. 6 is a flow chart illustrating an example method 600 used to generate the subscription instruction 110 that includes a template. Shown are operations 601 through 606. Operation 601, when executed, identifies the management information to be retrieved. The management information is retrieved based upon the existence of a subscription between the collector application server 102 and a network device such as network device 103. Operation 602 is executed to identify a reporting period for a subscription. The reporting period is the time interval for which management information is reported. Operation 603 is executed to identify a snapshot interval, where, for example, the reporting interval and the snapshot interval are different. Specifically, in some example cases the snapshot may be taken at a predetermined time (e.g., every three (3) minutes), whereas this management information snapshot 111 is reported every fifteen (15) minutes. Operation 604 is executed to define a data type and associated data type length for a template. This template is used to organize and facilitate the display of the management information. Operation 605 is executed to identify a network device (e.g., the network devices 103 through 105) to which to subscribe. Operation 606, when executed, transmits the subscription instruction 110. This subscription instruction 110 may be transmitted using IPFIX or some other suitable protocol.

Figure 7:
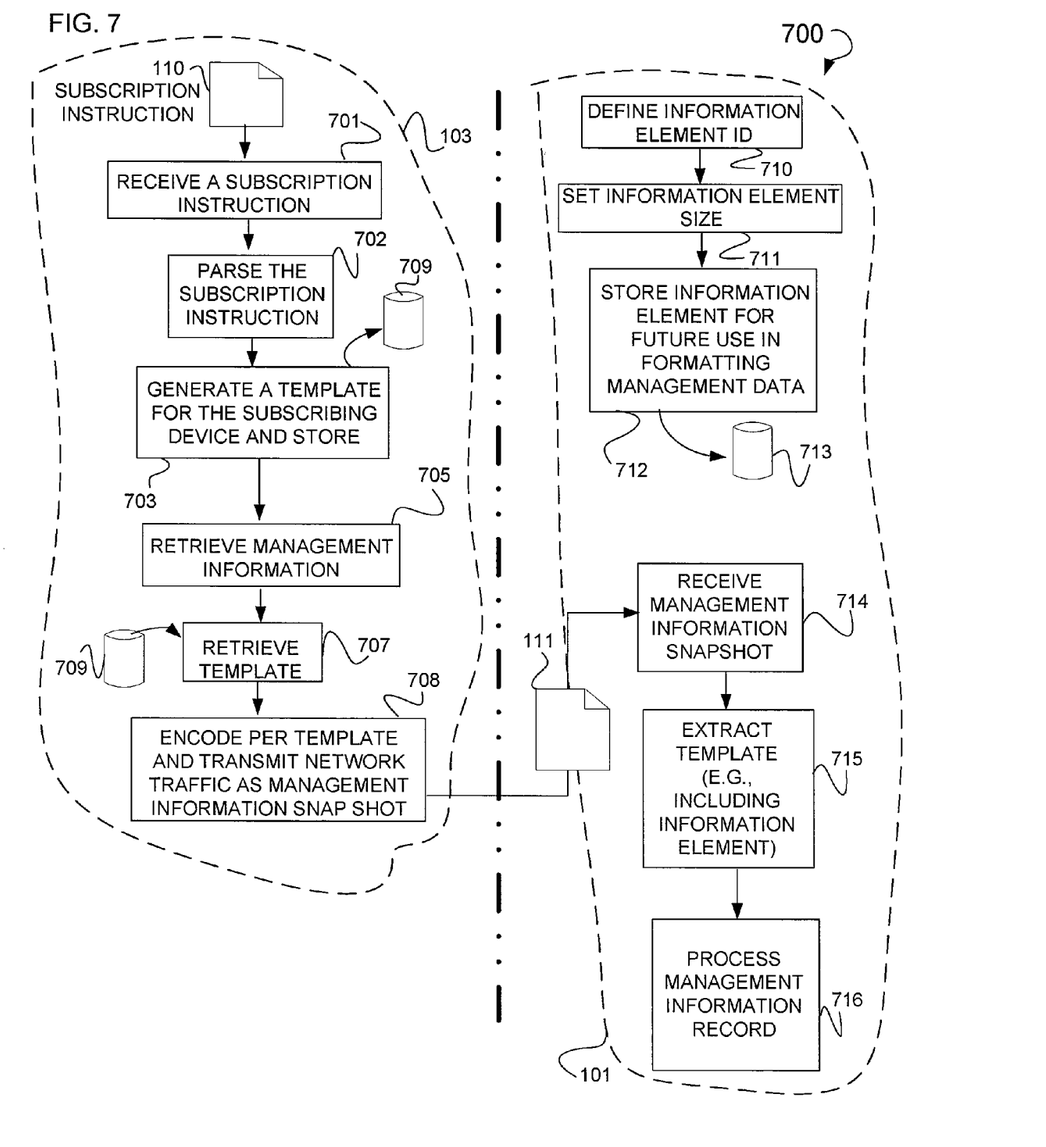
FIG. 7 is a dual-stream flow chart illustrating the execution of a method, according to an example embodiment, used to set up a subscription service for a network device and to periodically retrieve network data in the form of a management information snapshot.

FIG. 7 is a dual-stream flow chart illustrating the execution of an example method 700 used to set up a subscription to a network device to periodically receive management information. Shown are a variety of operations 701 through 708, wherein these operations 701 through 708 may reside upon the network device 103. Also shown are a number of operations 709 through 716 that may reside as part of the management application server 101. As stated elsewhere, these operations 709 through 711 may also reside as part of the collector application server 102. Operation 701, when executed, receives the subscription instruction 110. An operation 702 is executed to parse the subscription instruction 110 based upon the grammar for a particular scripting language and/or protocol. Operation 703 is executed to generate a template for the subscribing device and store this template. The template may be an IPFIX template that is stored according to a template ID. In some example embodiments, included as part of this template is an information element ID. The subscription service is initiated based upon instructions included within the subscription instruction 110.

In some example embodiment, a periodic snapshot time (e.g., a time interval during which management information is to be retrieved) is set. This period may be every 60 seconds, 120 seconds, 300 seconds or some other interval of time. A report time may be some measure of time used to determine when to send a snapshot of management information to the collector application server 102. Management information may be aggregated into a single management information snapshot 111. In some example embodiments, the report time may be based upon some type of event driven criteria (e.g., the reaching of a predefined CPU cycle amount, the reaching of a predefined memory usage amount), the occurrence of which serves as the basis to send the management information snapshot 111 to the collector application server 102. Operation 705 is executed to retrieve the management information for the network device 103. This management information is retrieved according to a command written in a scripting language such as CLI that is re-executed periodically so as to provide a subscription to the network device for the subscribing device (e.g., the collector application server 102). For example, if collector application server 102 subscribed to the network device 103 for CPU cycle information for this network device 103, then the operation 705 would use the CLI command to retrieve the CPU cycle information for a given time period in fulfillment of the subscription. In some example cases, the operation 705 filters the management information using various regular expressions. Operation 707, when executed, retrieves a template from a template data store 709. This template is retrieved from the template data store using a template ID (see e.g., the example Template ID value "256" referenced above). This template data store 709 includes templates specific to the subscription of some type of subscribing device. These subscriptions include, for example, the CPU cycles for the network device 103, the current time for the network device 103, memory utilization by the network device 103, link utilization by the network device 103, or error data generated by the network device 103. This retrieved template is used to format, encode, and transmit this management information. The template may use the aforementioned IPFIX in combination with TCP/IP, UDP/IP, SCTP/IP, or some other suitable protocols. Formatting, encoding per the template, and transmission may be facilitated through the execution of operation 708. This operation 708, when executed, transmits management information as the management information snapshot 111 as part of a subscription service initiated with the subscription instruction 110.

In some example embodiments, an operation 710 is executed to define an information element ID to be used to format management information received via the management information snapshot 111. Further, an operation 711 is executed to set an information element size (e.g., a data type size). An operation 712 is executed to store the information element for future use in formatting the management data. The information element is stored into a data store 713. Operation 714 is executed to receive the management information snapshot 111. Operation 715 is executed to extract the template including the information element. Operation 716 is executed to process the management information so as to, for example, display, or store the management information. This management information may be displayed as a visual graph, or stored for future use and reference. This management information may be used by a system administrator or other suitable person.

Figure 8:
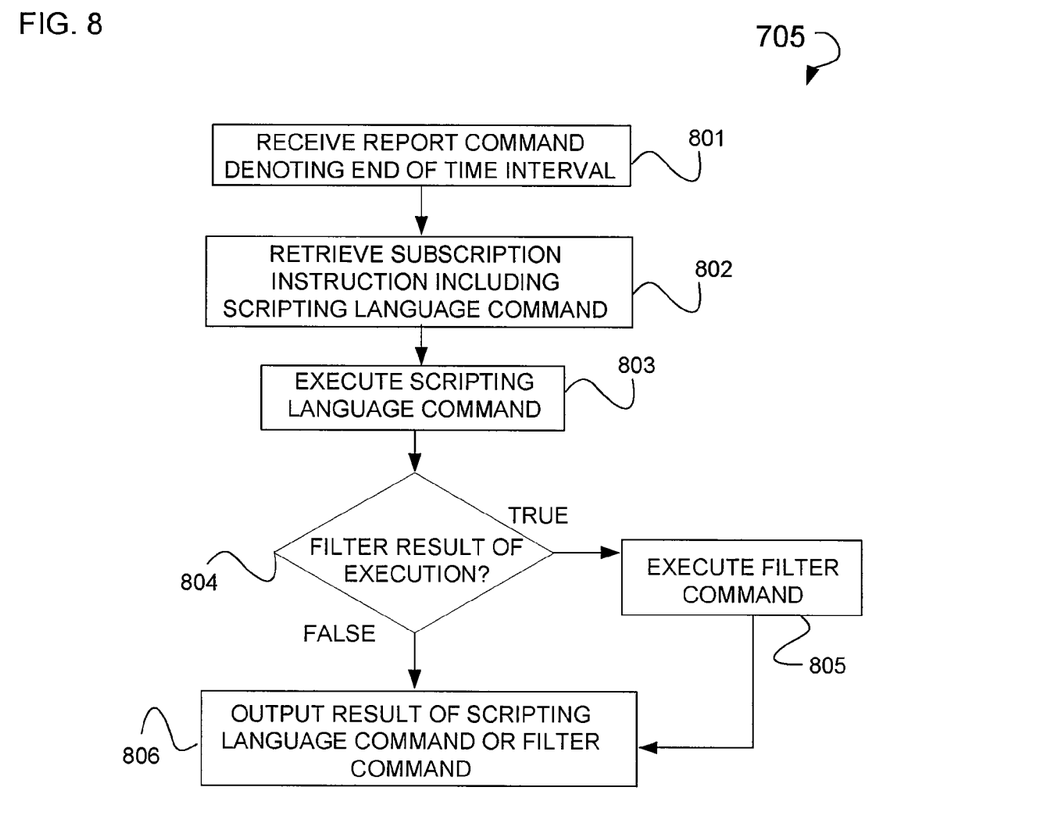
FIG. 8 is a flow chart illustrating a method, according to an example embodiment, to retrieve management information based upon a script command.

FIG. 8 is a flow chart illustrating the execution of the operation 705. Show is an operation 705 that is used to retrieve management information. This management information is retrieved via the execution of an operation 801 that receives a report command denoting the end of a time interval or period. The ending of this time interval may denote a time to report management information to the collector application server 102, or a time period for which management information is to be reported to this collector application server 102. Operation 802 is executed to retrieve a service language instruction including a scripting language command. This scripting language command may include the CLI "show" command. Operation 803 executes the scripting language command via, for example, interpreting or compiling the scripting language command. A decisional operation 804 is executed to determine whether a filter is to be applied to the result of the execution of the scripting language command. In cases where decisional operation 804 evaluates to "true," an operation 805 is executed. Operation 805 applies a filter to the results of the execution of the scripting language command. This filter may be in the form of a GREP command line utility used in combination with piping and the above illustrated enterprise-specific IPFIX element. When decisional operation 804 evaluates to "false," operation 806 is executed. An operation 806 is executed to output the result of the operation 803 or operation 803 and operation 805. This output is in the form of an IPFIX record formatted according to the IPFIX template and including the newly defined information element and the show output result.

In some embodiments, additional filters include: Cat—combine files; Colrm—remove specified columns from each line of data; Crypt—encode or decode data using specified key; Cut—extract selected portions of each line; Fmt—format text to fit character line; Head—display first few lines of data; Look—extract lines beginning with a specified pattern; Nl—create line number; Paste—combine columns of data; Pr—format data suitable for printing; Rev—reverse order of characters in each line of data; Sort—sort or merge data; Tail—display last few lines of data; Tr—translate or delete selected characters; Uniq—look for repeated lines, or Wc—count number of words. The result of this filtering, as illustrated above, is placed into an IPFIX record according to an IPFIX template, and reflects the output of an expression.

Figure 9:
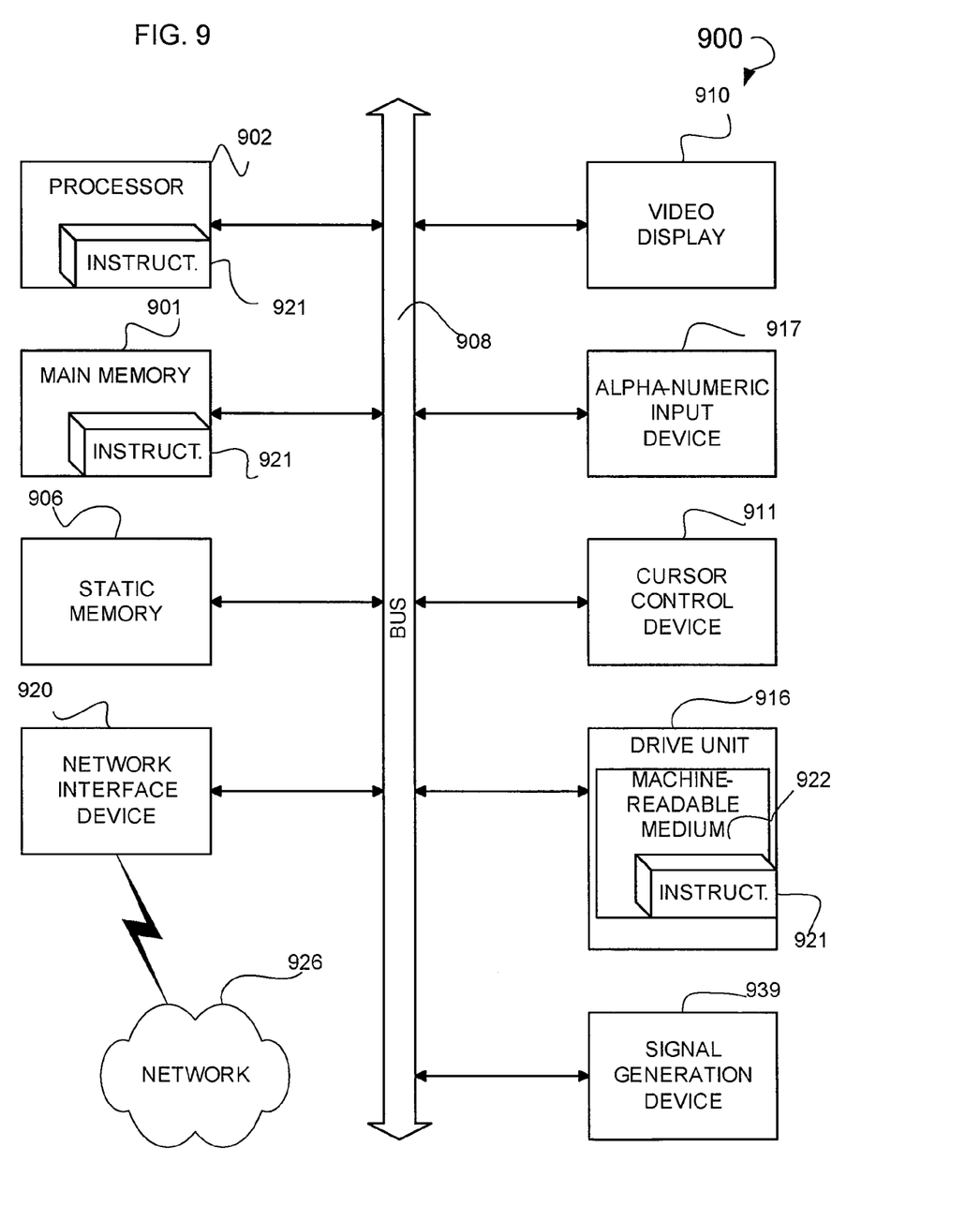
FIG. 9 shows a diagrammatic representation of a machine, according to an example embodiment, in the form of a computer system

FIG. 9 shows a diagrammatic representation of machine in the example form of a computer system 900 within which a set of instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a web appliance, a network router, switch, or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a Central Processing Unit (CPU), a Graphics Processing Unit (GPU) or both), a main memory 901 and a static memory 906, which communicate with each other via a bus 908. The computer system 900 may further include a video display unit 910 (e.g., a LCD or a CRT). The computer system 900 also includes an alpha-numeric input device 917 (e.g., a keyboard), a User Interface (UI) cursor control device 911 (e.g., a mouse), a disk drive unit 916, a signal generation device 939 (e.g., a speaker) and a network interface device 925 (e.g., a transmitter) 920.

The disk drive unit 916 includes a machine-readable medium 922 on which is stored one or more sets of instructions and data structures (e.g., software) 921 embodying or utilized by any one or more of the methodologies or functions illustrated herein. The instructions may also reside, completely or at least partially, within the main memory 901 and/or within the processor 902 during execution thereof by the computer system 900, the main memory 901 and the processor 902 also constituting machine-readable media.

The instructions 921 may further be transmitted or received over a network 926 via the network interface device 920 using any one of a number of well-known transfer protocols (e.g., Hyper-Text Transfer Protocol (HTTP), or a Secure Hyper Text Transfer Protocol (HTTPS)).

While the machine-readable medium 922 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that cause the machine to perform any one or more of the methodologies of the present method and apparatus, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a subscription instruction identifying a subscription to management information from a network device;
   periodically retrieving the management information from the network device based on the subscription instruction;
   formatting the management information according to an export template; and
   transmitting the management information utilizing a protocol.

2. The method of claim 1, wherein the subscription instruction includes a Command Line Interface (CLI) command.

3. The method of claim 2, wherein the Command Line Interface (CLI) command is used to retrieve the management information as Command Line Interface (CLI) command output.

4. The method of claim 1, wherein the subscription instruction includes at least one of a snapshot interval instruction or a report interval instruction.

5. The method of claim 4, wherein the snapshot interval instruction identifies an interval of time.

6. The method of claim 1, further comprising filtering the management information using a regular expression.

7. The method of claim 1, wherein the export template is based on an Internet Protocol Flow Information eXport (IPFIX) template.

8. The method of claim 1, wherein the protocol is the Internet Protocol Flow Information eXport (IPFIX) protocol.

9. The method of claim 1, wherein the management information includes at least one of Central Processing Unit (CPU) cycles for the network device, a current time for the network device, memory utilization by the network device, link utilization by the network device or error data generated by the network device.

10. A method comprising:
    receiving a management information snapshot as part of a periodic subscription; and
    using one or more processors, processing the management information snapshot based upon an export template, the export template defined as part of an Internet Protocol Flow Information eXport (IPFIX) protocol.

11. The method of claim 10, wherein the processing includes at least one of displaying a data record defined by the IPFIX protocol or storing a data record defined by the IPFIX protocol.

12. The method of claim 10, wherein the management information snapshot includes aggregated management information.

13. An apparatus comprising:
a receiver to receive a subscription instruction identifying a subscription to management information from the apparatus;
a periodic retrieving engine to retrieve the management information from the apparatus based on the subscription instruction, the periodic retrieving engine comprising one or more processors;
a formatting engine to format the management information according to an export template; and
a transmitter to transmit the management information utilizing a protocol.

14. The apparatus of claim 13, wherein the subscription instruction includes a Command Line Interface (CLI) command.

15. The apparatus of claim 14, wherein the Command Line Interface (CLI) command is used to retrieve the management information as Command Line Interface (CLI) command output.

16. The apparatus of claim 13, wherein the subscription instruction includes at least one of a snapshot interval instruction or a report interval instruction.

17. The apparatus of claim 16, wherein the snapshot interval instruction identifies an interval of time.

18. The apparatus of claim 13, further comprising a filter to filter the management information through the use of a regular expression.

19. The apparatus of claim 13, wherein the export template is based on an Internet Protocol Flow Information eXport (IPFIX) template.

20. The apparatus of claim 13, wherein the protocol is the Internet Protocol Flow Information eXport (IPFIX) protocol.

21. The apparatus of claim 13, wherein the management information includes at least one of Central Processing Unit (CPU) cycles for the apparatus, a current time for the apparatus, memory utilization by the apparatus, link utilization by the apparatus, or error data generated by the apparatus.

22. An apparatus comprising:
a receiver to receive a management information snapshot as part of a periodic subscription; and
a processing engine to process the management information snapshot based upon an export template, the export template defined as part of an Internet Protocol Flow Information eXport (IPFIX) protocol, the processing engine comprising one or more processors.

23. The apparatus of claim 22, wherein the processing includes at least one of displaying a data record defined by the IPFIX protocol or storing a data record defined by the IPFIX protocol.

24. The apparatus of claim 22, wherein the management information snapshot includes aggregated management information.

25. An apparatus comprising:
at least one processor; and
a memory in communication with the at least one processor, the memory including logic encoded in one or more tangible media for execution and when executed operable to:
receive a subscription instruction identifying a subscription to management information from the apparatus;
periodically retrieve the management information from the apparatus based on the subscription instruction;
format the management information according to an export template; and
transmit the management information utilizing a protocol.

* * * * *